United States Patent
Kamatani et al.

(10) Patent No.: US 9,170,994 B2
(45) Date of Patent: Oct. 27, 2015

(54) MACHINE TRANSLATION APPARATUS, METHOD AND COMPUTER READABLE MEDIUM

(71) Applicants: Satoshi Kamatani, Yokohama (JP); Akiko Sakamoto, Kawasaki (JP)

(72) Inventors: Satoshi Kamatani, Yokohama (JP); Akiko Sakamoto, Kawasaki (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 240 days.

(21) Appl. No.: 13/727,144

(22) Filed: Dec. 26, 2012

(65) Prior Publication Data

US 2013/0262076 A1    Oct. 3, 2013

(30) Foreign Application Priority Data

Mar. 29, 2012 (JP) .................................. 2012-075966

(51) Int. Cl.
    *G06F 17/28* (2006.01)
(52) U.S. Cl.
    CPC .................................. *G06F 17/2854* (2013.01)
(58) Field of Classification Search
    CPC ......... G06L 17/28; G06L 17/20; G06L 17/21; G06L 17/27; G06L 17/2809; G06L 17/2872; G06L 17/2881
    USPC ......................................... 704/2, 4, 5, 7, 277
    See application file for complete search history.

(56) References Cited

U.S. PATENT DOCUMENTS

| 8,214,197 | B2 * | 7/2012 | Kamatani et al. ................. 704/2 |
| 8,275,603 | B2 | 9/2012 | Furihata et al. |
| 2006/0224378 | A1 | 10/2006 | Chino et al. |
| 2006/0271350 | A1 * | 11/2006 | Chino et al. ...................... 704/2 |
| 2009/0222256 | A1 | 9/2009 | Kamatani et al. |
| 2011/0202334 | A1 * | 8/2011 | Abir ................................. 704/4 |

FOREIGN PATENT DOCUMENTS

| CN | 17841367 A | 10/2006 |
| JP | 7-56923 H | 3/1995 |
| JP | 10-247194 H | 9/1998 |
| JP | 3059398 B2 | 4/2000 |
| JP | 2001-188779 A | 7/2001 |

OTHER PUBLICATIONS

Japanese First Office Action dated Jul. 29, 2014 from JP Application No. 2012-075966, 9 pages.
Chinese First Office Action dated Aug. 18, 2015 from corresponding Chinese Patent Application No. 201310008439.4, 11 pages.

* cited by examiner

*Primary Examiner* — Qi Han
(74) *Attorney, Agent, or Firm* — Ohlandt, Greeley, Ruggiero & Perle, L.L.P.

(57) ABSTRACT

According to one embodiment, a machine translation apparatus includes a speech recognition unit, a translation unit, a detection unit and an addition unit. The speech recognition unit performs speech recognition of speech. The translation unit translates the plurality of source language strings into target language strings in a chronological order. The detection unit detects ambiguity in interpretation of the speech corresponding to a first target language string of the target language strings. The addition unit adds, an additional phrase being one of words and phrases to interpret uniquely a modification relationship, to the first target language string if ambiguity is detected.

14 Claims, 4 Drawing Sheets

| Division patterns |
|---|
| /(conjunction)/ |
| /(interjection)/ |
| (conjunction particle)/ |
| /(noun)( まで (made))/ |
| /(noun)( で (de))/ |
| /(noun)( で (de))/ |
| ⋮ |

FIG. 3

| | | |
|---|---|---|
| 401 — | R,place | [Correct modification target phrase in preceding context] | — 402
| | L,place | ですが (desuga) |
| | R,time | [Correct modification target phrase in preceding context] |
| | L,place | ですが (desuga) |
| | R,object | ね (ne) |
| | R,Subordinate_reason | [Correct modification target phrase in preceding context] |
| | R,Subordinate_condition | です (desu) |
| | ⋮ | ⋮ |

FIG. 4

| | | |
|---|---|---|
| 501 — | R,place_to | as for | — 502
| | L,place_to | as for |
| | R,time | um |
| | L,time | um |
| | R,subordinate-reason | well |
| | R,subordinate-condition | well |
| | ⋮ | ⋮ |

FIG. 5

Last Friday from John I heard you finished a market research survey.
↳ T2: ジョンから聞きました (jon kara kikimashita)
↳ T1: 先週の金曜日 (senshū no kinyoubi)

I will attend a meeting tomorrow. Could you provide the report to me?
↳ T5: 明日 (asita)
↳ T4: 会議に参加するのです (kaigi ni sanka surunodesu)
↳ T3: 市場調査を終えたことを (shijouthousa wo oetakotowo)

Before the meeting, I'd like check it.
↳ 確認しておきたいのです (kakunin site okitainodesu)
701
↳ 会議の前に (kaigi no mae ni)
↳ T6: 参加します。 レポートをもらえますか (sanka simasu. repōto wo moraemasuka)

FIG. 7

東京駅で (Tōkyō eki de) まず (mazu) 山手線に乗ります (yamanotesen ni norimasu)
↳ T2: first
↳ T1: At Tokyo station 浅草までは (Asakusa madeha)
上野駅で (Ueno eki de) 銀座線に乗り換えて向かいます (ginzasen ni norikaete mukaimasu)
↳ T5: At Ueno station
801
↳ T4: as for to Asakusa
↳ T3: you take a Yamanote line train ↳ you change for a Ginza line train and go to there

FIG. 8

MACHINE TRANSLATION APPARATUS, METHOD AND COMPUTER READABLE MEDIUM

CROSS-REFERENCE TO RELATED APPLICATIONS

This application is based upon and claims the benefit of priority from Japanese Patent Application No. 2012-075966, filed Mar. 29, 2012, the entire contents of which are incorporated herein by reference.

FIELD

Embodiments described herein relate generally to a machine translation apparatus, method and computer readable medium.

BACKGROUND

There is a translation machine that receives input of text in a source language (a first language) and translates the text to a demanded target language (a second language). Further, by improvement in speech language processing technology in recent years, there is a simultaneous translation machine that translates speech in a first language to a second language in an incremental manner.

BRIEF DESCRIPTION OF THE DRAWINGS

FIG. 3 illustrates another example of division patterns at the analysis unit.

FIG. 4 illustrates an example of phrase generation rules at the phrase generation unit.

FIG. 5 illustrates another example of phrase generation rules at the phrase generation unit.

FIG. 7 illustrates an example of machine translation process, from English to Japanese, performed by the machine translation apparatus.

FIG. 8 illustrates an example of machine translation process, from Japanese to English, performed by the machine translation apparatus.

DETAILED DESCRIPTION

Figures 1, 2:
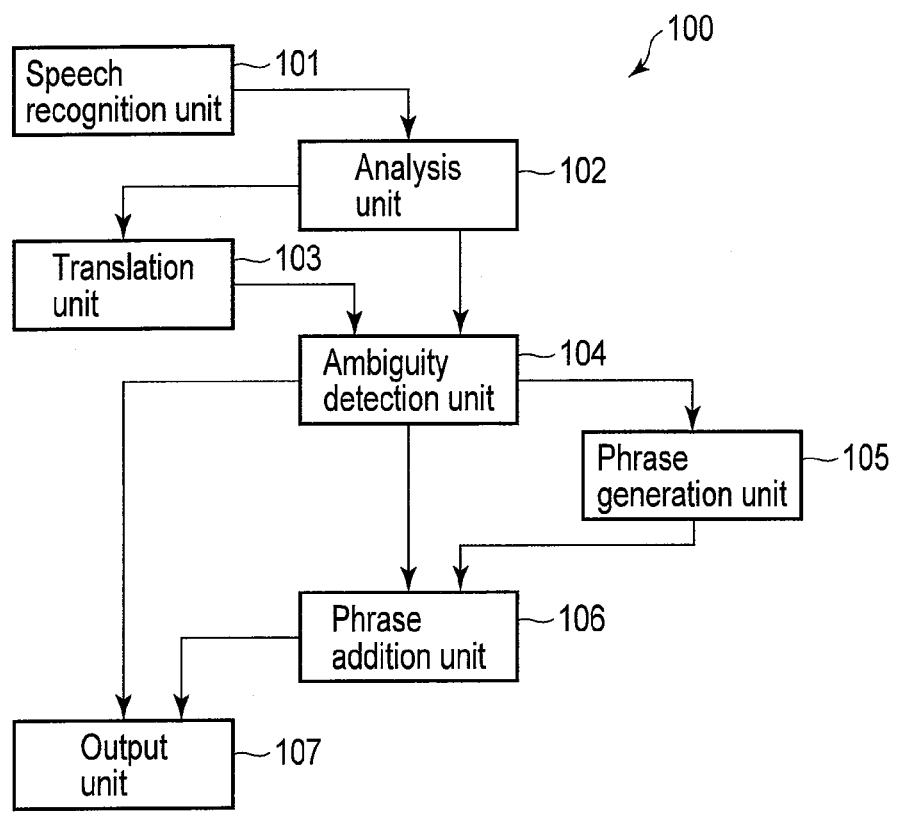
FIG. 1 is a block diagram illustrating a machine translation apparatus according to the present embodiment.
FIG. 2 illustrates an example of division patterns at the analysis unit of the machine translation apparatus.

With a conventional translation method, it is possible to adjust a translation result that is currently output by comparing translation results that have been already output and the current translation so as to maintain consistency in the translation as a whole. However, with such a conventional translation method, it is difficult to eliminate ambiguity in interpretation caused when a translation result obtained by independent translation (not comparing a current translation result with existing translation results) or a translation result which can be interpreted in more than one way without any contradiction is presented to users.

In general, according to one embodiment, a machine translation apparatus includes a speech recognition unit, an analysis unit, a translation unit, a detection unit and an addition unit. The speech recognition unit is configured to perform speech recognition of speech in source language to obtain a recognition result text as a result of the speech recognition. The analysis unit is configured to divide the recognition result text into a plurality of parts to obtain a plurality of source language strings for translating from the source language into target language. The translation unit is configured to translate the plurality of source language strings into a plurality of target language strings in a chronological order. The detection unit is configured to detect ambiguity in interpretation of the speech corresponding to a first target language string of the target language strings, based on a relationship between the first target language string and one or more second target language strings, the second target language strings chronologically preceding the first target language string. The addition unit is configured to add an additional phrase to the first target language string if ambiguity is detected, the additional phrase being one of words and phrases to interpret uniquely a modification relationship between the first target language string and the second target language strings.

In the following, a machine translation apparatus, method and computer readable medium according to an embodiment of the present disclosure will be described in detail with reference to the drawings. In the explanation of the embodiments below, each structure element will be explained only once to avoid redundancy.

In the present embodiment, translation between English and Japanese will be explained as an example; however, of course, translation according to the present embodiment can be carried out for any languages.

The machine translation apparatus according to the present embodiment will be explained below with reference to FIG. 1.

The machine translation apparatus 100 according to the present embodiment comprises a speech recognition unit 101, an analysis unit 102, a translation unit 103, an ambiguity detection unit 104, a phrase generation unit 105, a phrase addition unit 106, and an output unit 107.

The speech recognition unit 101 acquires user's speech in a first language (i.e., a source language), and performs speech recognition for the acquired speech to obtain a recognition result text. The recognition result text is a speech recognition result which is a text. The acquisition of speech at the speech recognition unit 101 is carried out successively in units of the speech recognition process while the input of speech from the user continues, and a recognition result text is passed down to a next step of process each time a recognition result is obtained. In the following, the speech recognition is carried out units of word; however, speech recognition can be carried out in units of sentence or phrase.

The analysis unit 102 receives the recognition result text from the speech recognition unit 101, and couples the recognition results and divides them into stings suitable for translation process. Then, the analysis unit 102 generates a source language string. The source language string is a string of words in a first language. The details of the analysis unit 102 will be described later with reference to FIGS. 2 and 3.

The translation unit 103 receives the source language string from the analysis unit 102 and translates the source language string in a target language to obtain a target language string. The target language string is a string of words in a second language. For example, when a Japanese sentence is translated into an English sentence, a source language string is the Japanese sentence, and a target language string is the English sentence.

The ambiguity detection unit 104 receives a source language string from the analysis unit 102, and a target language string corresponding to the source language string from the translation unit 103. The ambiguity detection unit 104 analyzes the source language string based on target language strings generated in the past for a series of speech by the same user, and detects any ambiguity in an interpretation of the target language string.

In the present embodiment, a modification relationship (i.e., a relationship between a modifier and a target of the modifier) is used to detect ambiguity, and whether or not the target language string has more than one modification relationship is detected. In the present embodiment, it is assumed that the ambiguity detection unit 104 stores a target language string received from the translation unit 103. A storage (not shown) can be provided to store target language strings. In this case, if analysis is performed by the ambiguity detection unit 104, target language strings that were output in the past can be extracted from the storage unit.

The phrase generation unit 105 receives, from the ambiguity detection unit 104, a result of ambiguity detection performed on the target language string, and generates an additional string in accordance with a type of ambiguity. The additional string is a string to help a user to interpret uniquely the modification relationship between the target language strings based on content of the speech. The details of the phrase generation unit 105 will be described later with reference to FIGS. 4 and 5.

The string addition unit 106 receives the target language string from the ambiguity detection unit 104, and the additional string from the phrase generation unit 105, and adds the additional string to the target language string.

The output unit 107 receives the target language string from the ambiguity detection unit 104, and if ambiguity is detected at the ambiguity detection unit 104, the target language string to which the additional string is added from the string addition unit 106. The output unit 107 outputs, the target language string and the target language string to which the additional string is added, to the outside of the apparatus.

Next, an example of division patterns for parsing at the analysis unit 102 is explained with respect to FIGS. 2 and 3.

FIG. 2 shows a table of division patterns for English, and FIG. 3 illustrates a table of division patterns for Japanese.

To realize real-time translation using machine translation, it is necessary to reduce the length of the time between a user's utterance and the output of a translation, i.e., latency, as much as possible. To obtain low latency, it is necessary to process speech input in a real-time and incremental manner, and to translate the input in units as short as possible. However, accuracy in understanding of translation will be decreased if the strings are translated in too short units. For example, a literal translation, i.e., word-by-word translation, has lower latency; however, it is difficult to retain the original meaning when translating between languages with great difference in their word orders, for example, Japanese and English.

Accordingly, a rule-based pattern matching method is used in the present embodiment as a method of determining division positions to parse a text.

A text that matches the division pattern shown in FIGS. 2 and 3 is divided at the positions indicated by slashes (/) in the division pattern. For example, in an English text, the division pattern "/(conjunction)/" shown in FIG. 2 indicates that a sentence is divided into parts by a conjunction. For example, the sentence "It is going to rain, but we continue to work." is divided into three parts by the conjunction "but."

Similarly, in the case of a Japanese sentence, the division pattern "conjunction particle)/" shown in FIG. 3 means that a sentence is divided after the conjunction particle. For example, the sentence "今日は晴れているので、散歩に出かける (kyouwa hareteirunode, sanponidekakeru) (translation: "Since today is sunny, I go for a walk.") is divided into two parts by the conjunction particle "ので" (node) (translation: since)."

The analysis unit 102 performs the above-described pattern matching for a recognition result text every time when a recognition result text is received from the speech recognition unit 101. If the recognition result matches any of the division patterns, the analysis unit 102 divides the recognition result text with slashes in accordance with the division patterns to obtain the divided sentence as a source language string.

A parsing method may be used to determine positions to divide a sentence, and a sentence is translated whenever a certain sentence structure is accumulated. For example, at a chart parser using a context free grammar, when a predetermined grammar category (terminal symbols, nonterminal symbols) appears, a method dividing a sentence at units of string corresponding to a subordinate grammar structure can be adopted. Further, a position where a translation begins can be detected with a statistical method. For example, a corpus to which translation start positions are given in advance is prepared, modeling of appearance of translation start positions with a machine learning procedure. With this model, a translation start position in a recognition result text can be predicted, and a recognition result text divided at the position can be obtained as a source language string.

Next, an example of phrase generation rules used by the phrase generation unit 105 is explained with reference to FIGS. 4 and 5.

FIG. 4 shows a table of phrase generation rules when a target language string is a Japanese text, and FIG. 5 shows a table of phrase generation rules when a target language string is an English text. In the present embodiment, the phrase generation rules are different for each language; however, the rules can be integrated so that the rules can be shared by several languages.

For the phrase generation rules, a condition 401 for ambiguity in a modification relationship occurred between a newly-output target language string and a series of previously-output target language strings in a preceding context is corresponded to a generated phrase 402.

The condition 401 represents a direction of ambiguity in the modification relationship and a type of the ambiguity. The direction of ambiguity in the modification relationship is represented by "R" and "L." "R" indicates that "a newly-output target language string is incorrectly modified by a target language string in a preceding context that is output previously." "L" indicates that "a newly-output target language string incorrectly modifies a target language string in a preceding context that is output previously."

The type of the ambiguity in the modification relationship represents a semantic attribute of a phrase, such as a phrase indicating place, time, object, reason in subordinate clause. In the examples shown in FIG. 4, the direction of the ambiguity in the modification relationship and the type of the ambiguity are separated by commas.

The generated phrase 402 indicates an additional phrase itself, or how to generate an additional phrase. For example, if a phrase is directly generated, the condition 401 "L, place" corresponds to the generated phrase 402 "ですが (desuga)."

Further, as shown in FIG. 4, not only set phrases, such as "ですが" and "ね (ne)," but free additional phrase may be generated based on a context.

More specifically, in the following, an example where an English text "Because the train is delayed due to the strong wind, we do not refund." is generated as a recognition result text, and is incrementally translated into "電車が遅れたので (densyaga okuretanode) (translation: because the train is delayed)," "強風のため (kyouhu no tame) (translation: due to the strong wind)," and "返金できません (henkin dekimasen) (translation: we do not refund)" as target language strings, is assumed.

Herein, only the part "電車が遅れたので (because the train is delayed)" in the recognition result text should be a candidate of the modification target for the part "強風のため (due to the strong wind)." However, as the recognition result is incrementally translated, both interpretations "(強風のため)電車が遅れたので (translation: the train is delayed because of the strong wind)" and "(強風のため)返金できません (translation: we do not refund because of the strong wind)" are possible. In other words, more than one modification relationships are possible in the translation.

Referring to the phrase generation rules shown in FIG. 4, the part "強風のため (due to the strong wind)" corresponds to the condition 401, "R, subordinate clause_reason." The newly-output target language string "返金できません (we do not refund)" has the relationship "subordinate clause_reason," and thus, the preceding target language string "強風のため (due to the strong wind)" incorrectly modifies the string "返金できません (we do not refund)." Then, "a correct modification target phrase" is extracted. In this example, the correct modification target phrase "遅れたので ((the train) is delayed)" for the string "強風のため (due to the strong wind)" in the target language is generated as an additional phrase.

For the phrase generation rules shown in FIG. 5, similarly to the rule shown in FIG. 4, a condition 501 for ambiguity in a modification relationship occurred between a newly-output target language string and a series of previously-output target language strings in a preceding context is corresponded to a generated phrase 502 indicating an additional phrase to be generated. For example, the condition 501 "R, place_to" is corresponded to the generated phrase 502 "as for."

Figure 6:
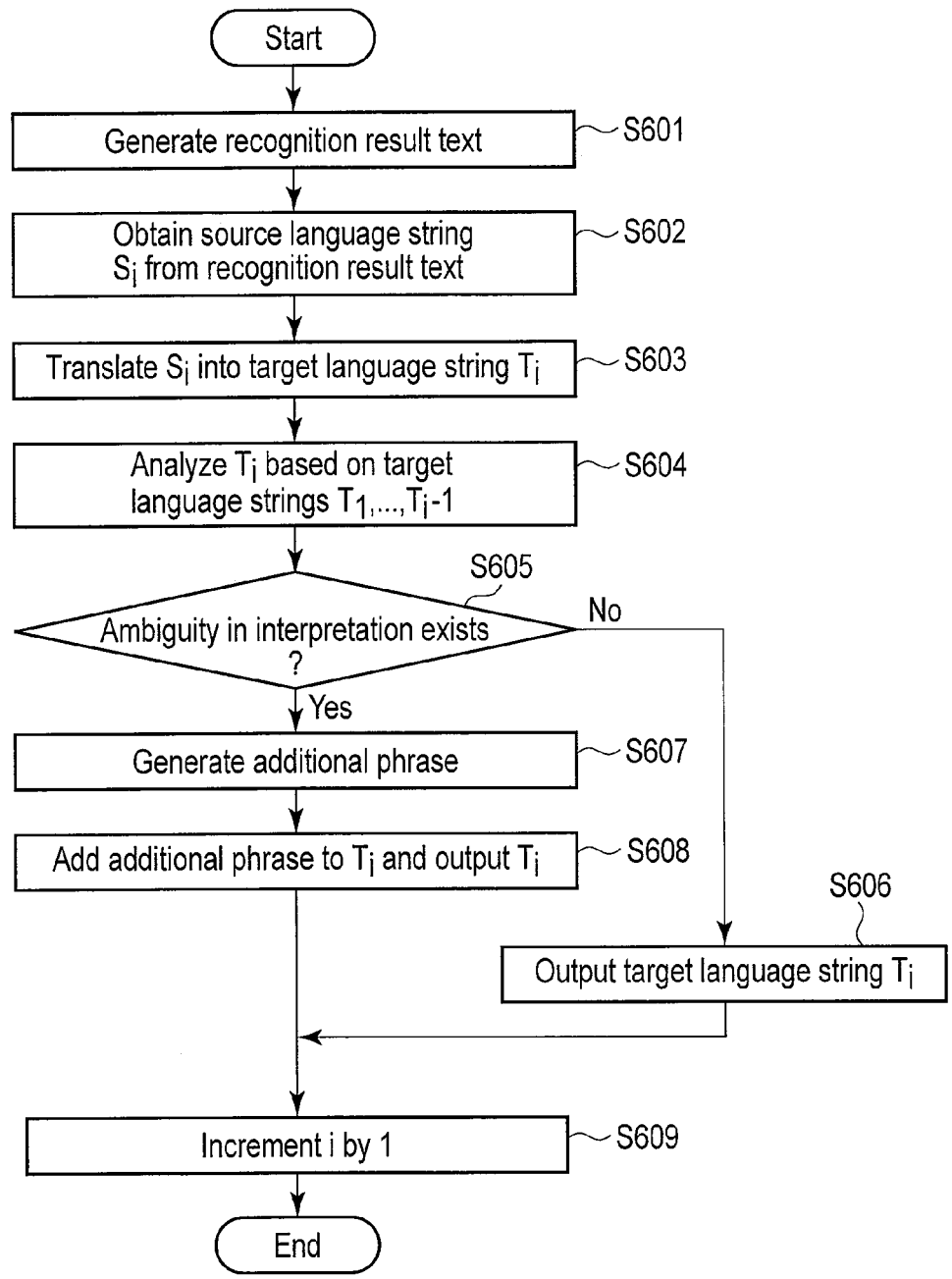
FIG. 6 is a flowchart illustrating operation at the machine translation apparatus.

Next, the operation of the machine translation apparatus 100 according to the present embodiment is explained with reference to the flowchart shown in FIG. 6.

In step S601, the speech recognition unit 101 obtains speech and performs speech recognition processing on the speech to obtain a recognition result text. The speech recognition process at the speech recognition unit 101 can be done in the following order, for example. First, a speech signal input is divided by a certain fixed length of time. Then, Fourier and cosine transformation are performed for the obtained speech signal of the certain fixed period of time to generate a feature vector consisting of cepstrum coefficients. Based on speech patterns that are constructed in advance, using one of dynamic programming (DP) matching, a method based on segmentation and phonetics labeling, a hidden Markov models (HMM) method, and a neutral network, a category that corresponds to a model maximizing a serial likelihood of an obtained feature vector should be determined as a recognition result.

A method for improving speech recognition accuracy by a language model that is built through learning occurrence probability of word sequence, using language resources and a corpus, may be applied.

In step S602, the analysis unit 102 divides the recognition result text into units for which the machine translation process is performed, using a method as described in FIGS. 2 and 3 above, and a source language string $S_i$ (i is a natural number, and indicates the chronological order of strings to be machine-translated) is obtained.

In step S603, the translation unit 103 translates the source language string $S_i$ into a target language string $T_i$. As the translation process at the translation unit 103 can be performed using a common machine translation method, such as a transfer-based method, example-based method, statistical method, intermediate language method, explanation of the translation process at this step is omitted.

In step S604, the ambiguity detection unit 104 analyzes target language string $T_i$ to be machine-translated at the time i based on target language strings $T_1, T_2, \ldots, T_{i-1}$ which are results of the translation in step S601 through step S603 in the past. In the present embodiment, as the analysis can be carried out by a common method, such as parsing using, for example, early parser, chart parser, generalized LR parser, or modification relationship analysis using a maximum spanning tree, explanation of the analysis at this step is omitted.

In step S605, the ambiguity detection unit 104 detects any ambiguity in interpretation of target language string $T_1$ to be machine-translated at the time i. If there is any ambiguity in the interpretation of target language string $T_i$, the process proceeds to step S607, and if there is no ambiguity, proceeds to step S606.

In step S606, the output unit 107 outputs the target language string. In the present embodiment, the target language string is audio-synthesized, and output to a user of the target language string as audio. The audio synthesis can be carried out using a common method, such as speech synthesis by editing speech segment, formant synthesis, speech corpus-based speech synthesis, text-to-speech, etc. The output of the target language string is not limited to audio; rather, a target language string can be transformed to a text to be output on a display device, and a target language string can be output by combining various output means and display means, such as a printer.

In step S607, the phrase generation unit 105 generates an additional phrase in accordance with a type of ambiguity in interpretation by following the rules shown in FIGS. 4 and 5, as explained above.

In step S608, the phrase addition unit 106 adds an additional phrase to target language string $T_i$, and the output unit 107 outputs the target language string to which the additional phrase is added. The phrase addition unit 106 may add a same word or phrase regardless of a type of ambiguity in interpretation, other than an additional phrase generated by the phrase addition unit 105. For example, an interjection or filler may be added.

In step S609, i is incremented by 1, and then the process returns to step S601, and the same process is repeated. The operation of the machine translation apparatus is completed.

Next, the specific example of the machine translation carried out by the machine translation apparatus 100 according to the present embodiment is explained with referenced to FIG. 7.

FIG. 7 shows an example where the speech recognition unit 101 recognizes a speech in English to obtain a recognition result text, and the analysis unit 102 obtains source language strings by dividing the recognition result units as indicated by the underlines. As source language strings, "Last Friday," "from John I heard," "you finished a market research survey" are obtained in this order.

First, the analysis unit 102 obtains the string "先週の金曜日 (Last Friday)," and the translation unit 103 translates the string, and a target language string $T_1$ is obtained as shown in FIG. 7 (in this example, the target language is Japanese). At this point, since there is no preceding source language string, no ambiguity in interpretation of the target language string occurs.

Next, the analysis unit 102 obtains "from John I heard," and the translation unit 103 translates to obtain a target language string $T_2$ "ジョンから聞きました" as shown in FIG. 7.

In a similar manner, target language string $T_3$ "市場調査を終えたこと (shijouthousa wo oetakotowo)" is obtained for the string "you finished a market research survey," then, target language string $T_4$ "'会議に参加 1するのです (kaigi ni sanka surunodesu)" for the string "I will attend a meeting" is obtained, subsequently, target language string $T_5$ "明日 (asita)" is obtained for the string "tomorrow." As the process to obtain those texts $T_3$ to $T_5$ are the same as the above, explanation is omitted.

Next, target language string $T_6$ "レポート をもらえますか (repoto wo moraemasuka)" for the string "Could you provide the report to me" is obtained.

Herein, as a result of analysis of, at the ambiguity detection unit 104, target language strings $T_1, \ldots, T_5$ translated in the past and current target language string $T_6$, suppose if the ambiguity detection unit 104 detects that $T_5$ "明日 (tomorrow)" may modify $T_6$ "レポートをもらえますか (Could you provide the report to me)." In other words, the text in the target language (Japanese) is interpreted as "'明日レポートをもらえますか (Could you provide the report to me tomorrow)" in Japanese, whereas the source language string as a recognition result text (in this case, in English) says "明日会議に参加する (I will attend the meeting tomorrow.)"

In other words, the ambiguity detection unit 104 determines that a target language string to be output next may be modified by a target language string in preceding context output before the newly-output target language string. Further, as target language string $T_5$ is "明日 (tomorrow)" which indicates tense of a sentence, the ambiguity detection unit 104 determines that a modification relationship is "time." Therefore, the ambiguity detection unit 104 detects ambiguity in interpretation of the text in Japanese when analyzing target language string $T_6$.

The phrase generation unit 105 selects an additional word and phrase "a phrase as a correct modification target in a preceding context" in a condition corresponds to the ambiguity of the interpretation based on the word generation rules shown in FIG. 4. In other words, the phrase generation unit 105 selects the segment "参加するのです (will attend)" from target language string $T_4$ as a correct modification target for target language string $T_5$. The phrase generation unit 105 generates "参加します (will attend)" as an additional string 701 based on the selected segment.

The phrase addition unit 106 generates "参加します。レポートをもらえますか (will attend. Could you provide the report to me)" by adding the additional string 701 to target language string $T_5$. Thus, the possibility that the impossible interpretation "could you provide the report to me tomorrow" is made is reduced.

Finally, the output of the target language string at the output unit 107 will be, in an incremental manner, "先週の金曜日 (last Friday)," "ジョンから聞きました (from John I heard)," "市場調査を終えたことを (you finished a market research survey)," "会議に参加 するのです (I will attend the meeting)," "明日 (tomorrow)," "参加します。レポートをもらえますか (I will attend. Could you provide the report to me?)." Thus, the content that "I will attend the meeting" in the original text becomes clear, and the meaning in the English text can be interpreted as it meant in the Japanese translation. Therefore, a translation that does not involve ambiguity in interpretation can be provided.

Next, an example will be given where the source language is Japanese and the target language is English with reference to FIG. 8.

Similar to the example in FIG. 7, the analysis unit 102 incrementally obtains source language strings "東京駅で (Tokyo eki de)," "まず (mazu)," "山手線に乗ります (yamanotesen ni norimasu)" in this order.

The translation unit 103 obtains target language strings $T_1$ to $T_3$ "At Tokyo station," "first," "you take a Yamanote Line train" for the above source language strings, respectively.

Subsequently, target language string $T_4$ for "to Asakusa" is obtained. At this point, as a result of analysis of target language strings $T_1$, $T_2$ and $T_3$ and target language string $T_4$ at the ambiguity detection unit 104, the ambiguity detection unit 104 detects that target language string T4 "to Asakusa" might modify "train" in target language string $T_3$ "you take a Yamanote Line train." If this is the case, the original text will be interpreted as "train to Asakusa" in the target language. However, according to the original text, the segment "to Asakusa" modifies the segment "you change for a Ginza Line train and go to there"; thus, the interpretation "train to Asakusa" is incorrect. Target language string $T_4$ "to Asakusa" should modify target language string $T_5$ "At Ueno Station" that follows $T_4$.

The ambiguity detection unit 104 determines that target language string to be newly output will incorrectly modify target language strings preceding the text that is going to be newly output. The ambiguity detection unit 104 determines the modification relationship as "place_to." Therefore, the ambiguity detection unit 104 detects ambiguity in the interpretation in the target language.

The phrase generation unit 105 generates "as for" as an additional string 801 in accordance with the phrase generation rules shown in FIG. 5. The phrase addition unit 106 adds the additional phrase 801 to target language string $T_4$, and generates "as for to Asakusa." By this addition, the source language string "as for to Asakusa" is interpreted uniquely, and the string can be interpreted separately from the preceding target language strings. Thus, the meaning in the source language string is correctly reflected to the target language string, and ambiguity is eliminated from the interpretation.

The phrase generation unit 105 according to the present embodiment generates an additional string using modification relationships as condition for the text generation; however, other conditions may be used to generate additional strings. For example, an additional phrase to be generated can be determined based on at least one a time elapsed since the target language string was output, a length of silent period in speech in the source language, a length of the target language string, a length of the source language string, a time required to start speech, and intensity of ambiguity.

More specifically, if a time elapsed since the target language string was output is longer than a predetermined length of time, or if a length of silent period in speech in the source language is longer than a predetermined length of time, it can be assumed that a user (speaker) is trying to remember what he or she wants to say, or a user finishes his or her speech (for example, one sentence). In such cases, the phrase generation unit 105 can generate an interjection, a word or phrase (in text or sound) that indicates a sentence is ended, regardless of existence of modification relationship among the output strings.

The term generation unit 105 can set priority in the generation of additional phrases to determine what kind of additional phrase should be generated in accordance with a source language or a target language, a type of speech, gender and age of speaker. For example, if a speaker is female and an interjection is generated as an additional phrase, priority can be put on interjections that a female speaker is likely to say in the source or target language.

According to the machine translation apparatus according to the present embodiment shown in the above, when ambiguity occurs in interpretation of incrementally-translated target language strings, a translation that reduces a possibility of user's misunderstanding can be provided by adding a phrase that would eliminate the ambiguity to a target language string, and thus, appropriate simultaneous translation can be realized.

The flowcharts of the embodiments illustrate methods and systems according to the embodiments. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A machine translation apparatus, comprising:
   at least a processor and memory;
   a speech recognition unit configured to perform speech recognition of speech in source language to obtain a recognition result text as a result of the speech recognition;
   an analysis unit configured to divide the recognition result text into a plurality of parts to obtain a plurality of source language strings for translating from the source language into target language;
   a translation unit configured to translate the plurality of source language strings into a plurality of target language strings in a chronological order;
   a detection unit configured to detect ambiguity in interpretation of the speech corresponding to a first target language string of the target language strings, based on a relationship between the first target language string and one or more second target language strings, the second target language strings chronologically preceding the first target language string; and
   an addition unit configured to add an additional phrase to the first target language string if ambiguity is detected, the additional phrase being one of words and phrases to interpret uniquely a modification relationship between the first target language string and the second target language strings, wherein the detection unit analyzes the modification relationship of words and phrases between the first target language string and the second target language strings, and detects the ambiguity if at least one of the first target language string and the second target language strings has two or more modification relationships.

2. The apparatus according to claim 1, further comprising a generation unit configured to generate the additional phrase in accordance with a type of the detected ambiguity.

3. The apparatus according to claim 2, wherein the generation unit generates the additional phrase using a first phrase in a second target language string which is a correct modification target in accordance with a modification direction of the modification relationship.

4. The apparatus according to claim 2, wherein the generation unit determines the additional phrase based on at least one of the source language strings, the target language strings, a content type of the speech, a gender of a speaker, and age of the speaker.

5. A machine translation method, comprising:
   controlling a processor or programmable apparatus to execute the steps of:
   performing speech recognition of speech in source language to obtain a recognition result text as a result of the speech recognition;
   dividing the recognition result text into a plurality of parts to obtain a plurality of source language strings for translating from the source language into target language;
   translating the plurality of source language strings into a plurality of target language strings in a chronological order, the plurality of target language strings including a first target language string and one or more second language strings which chronologically precedes the first target language string;
   detecting ambiguity in interpretation of the speech corresponding to the first target language string, based on a relationship between the first target language string and the second target language strings; and
   adding an additional phrase to the first target language string if ambiguity is detected, the additional phrase being one of words and phrases to interpret uniquely a modification relationship between the first target language string and the second target language strings.

6. The method according to claim 5, further comprising generating the additional phrase in accordance with a type of the detected ambiguity.

7. The method according to claim 6, wherein the generating the additional phrase generates the additional phrase using a first phrase in a second target language string which is a correct modification target in accordance with a modification direction of the modification relationship.

8. The method according to claim 6, wherein the generating the additional phrase determines the additional phrase based on at least one of the source language strings, the target language strings, a content type of the speech, a gender of a speaker, and age of the speaker.

9. The method according to claim 5, wherein the detecting the ambiguity analyzes the modification relationship of words and phrases between the first target language string and the second target language strings, and detects the ambiguity if at least one of the first target language string and the second target language strings has two or more modification relationship.

10. A non-transitory computer readable medium including computer executable instructions, wherein the instructions, when executed by a processor, cause the processor to perform a method comprising:
   performing speech recognition to perform speech recognition of speech in source language to obtain a recognition result text as a result of the speech recognition;
   dividing the recognition result text into a plurality of parts to obtain a plurality of source language strings for translating from the source language into target language;
   translating the plurality of source language strings into a plurality of target language strings in a chronological order, the plurality of target language strings including a first target language strings and one or more second language string which chronologically precedes the first target language string;
   detecting ambiguity in interpretation of the speech corresponding to the first target language string, based on a relationship between the first target language string and the second target language strings; and
   adding an additional phrase to the first target language string if ambiguity is detected, the additional phrase being one of words and phrases to interpret uniquely a modification relationship between the first target language string and the second target language strings.

11. The medium according to claim 10, further comprising generating the additional phrase in accordance with a type of the detected ambiguity.

12. The medium according to claim 11, wherein the generating the additional phrase generates the additional phrase using a first phrase in a second target language string which is a correct modification target in accordance with a modification direction of the modification relationship.

13. The medium according to claim 11, wherein the generating the additional phrase determines the additional phrase based on at least one of the source language strings, the target language strings, a content type of the speech, a gender of a speaker, and age of the speaker.

14. The medium according to claim 10, wherein the detecting the ambiguity analyzes the modification relationship of words and phrases between the first target language string and the second target language strings, and detects the ambiguity if at least one of the first target language string and the second target language strings has two or more modification relationship.

* * * * *

UNITED STATES PATENT AND TRADEMARK OFFICE
CERTIFICATE OF CORRECTION

PATENT NO. : 9,170,994 B2
APPLICATION NO. : 13/727144
DATED : October 27, 2015
INVENTOR(S) : Kamatani et al.

Page 1 of 1

It is certified that error appears in the above-identified patent and that said Letters Patent is hereby corrected as shown below:

On the title page item 56 under "Foreign Patent Documents":

Please correct: "CN 17841367" to -- CN 1841367 --.

Signed and Sealed this
First Day of March, 2016

Michelle K. Lee
*Director of the United States Patent and Trademark Office*